United States Patent
Paymal et al.

(10) Patent No.: US 9,495,557 B2
(45) Date of Patent: Nov. 15, 2016

(54) METHODS AND SYSTEMS FOR MANAGING ACCESS TO DATA IN AN ON-DEMAND SYSTEM

(71) Applicant: SALESFORCE.COM, INC., San Francisco, CA (US)

(72) Inventors: Nicolas Paymal, San Francisco, CA (US); Francois Lopitaux, San Francisco, CA (US); Fabien Cochard, Paris (FR); Gregoire Lejeune, Asnières sur Seine (FR)

(73) Assignee: salesforce.com, inc., San Francisco, CA (US)

( * ) Notice: Subject to any disclaimer, the term of this patent is extended or adjusted under 35 U.S.C. 154(b) by 163 days.

(21) Appl. No.: 14/030,519

(22) Filed: Sep. 18, 2013

(65) Prior Publication Data
US 2014/0115003 A1    Apr. 24, 2014

Related U.S. Application Data

(60) Provisional application No. 61/702,619, filed on Sep. 18, 2012.

(51) Int. Cl.
*G06F 17/30* (2006.01)
*G06F 21/62* (2013.01)

(52) U.S. Cl.
CPC ................................. *G06F 21/6227* (2013.01)

(58) Field of Classification Search
CPC ..................... G06F 17/30867; G06F 17/3089; G06Q 10/10; G06Q 30/02
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Cam-Y Truong
(74) *Attorney, Agent, or Firm* — Weaver Austin Villeneuve & Sampson LLP

(57) ABSTRACT

Data category visibility are defined at the permission set and profile levels so that users who may not be assigned a role can have the data filtered by data category access rules. In an embodiment, data is filtered based on products or projects so that the products or project can be used as a data category group, once the product or project as been assigned to the user, the user may be granted access, via a data category visibility in a permission set, regardless of the user's role or position in the user hierarchy.

19 Claims, 17 Drawing Sheets

(56) References Cited

U.S. PATENT DOCUMENTS

| | | |
|---|---|---|
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0206834 A1* | 9/2006 | Fisher et al. ............ 715/777 |
| 2008/0092068 A1* | 4/2008 | Norring ............ G06Q 10/06 715/762 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |

(56) References Cited

U.S. PATENT DOCUMENTS

| | | |
|---|---|---|
| 2011/0213789 A1* | 9/2011 | Doshi ............... G06F 21/6218 707/754 |
| 2011/0218958 A1 | 9/2011 | Warshavsky et al. |
| 2011/0247051 A1 | 10/2011 | Bulumulla et al. |
| 2011/0307510 A1 | 12/2011 | Lopitaux et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2012/0330644 A1 | 12/2012 | Giraudy et al. |
| 2013/0151231 A1 | 6/2013 | Giraudy et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

* cited by examiner

Permission Set
KB perms for HVCPU

Find settings...

Close | Delete | Edit Properties

602

Permission Set Overview > Data Category Visibility — 646

606  608   610

Category Group Visibility Settings 648

604

| Action | Category Group | Visibility | Visibility Details |
|---|---|---|---|
| Edit | Customer Type | Custom | All > Consumer |
| Edit | Products | Custom | All > Desktops<br>All > Laptops<br>All > Printers<br>All > Web Cam |
| Edit | Story Community Topics | All | All categories are visible to this permission set |
| Edit | Support Options | All | All categories are visible to this permission set |

650   652   654   656

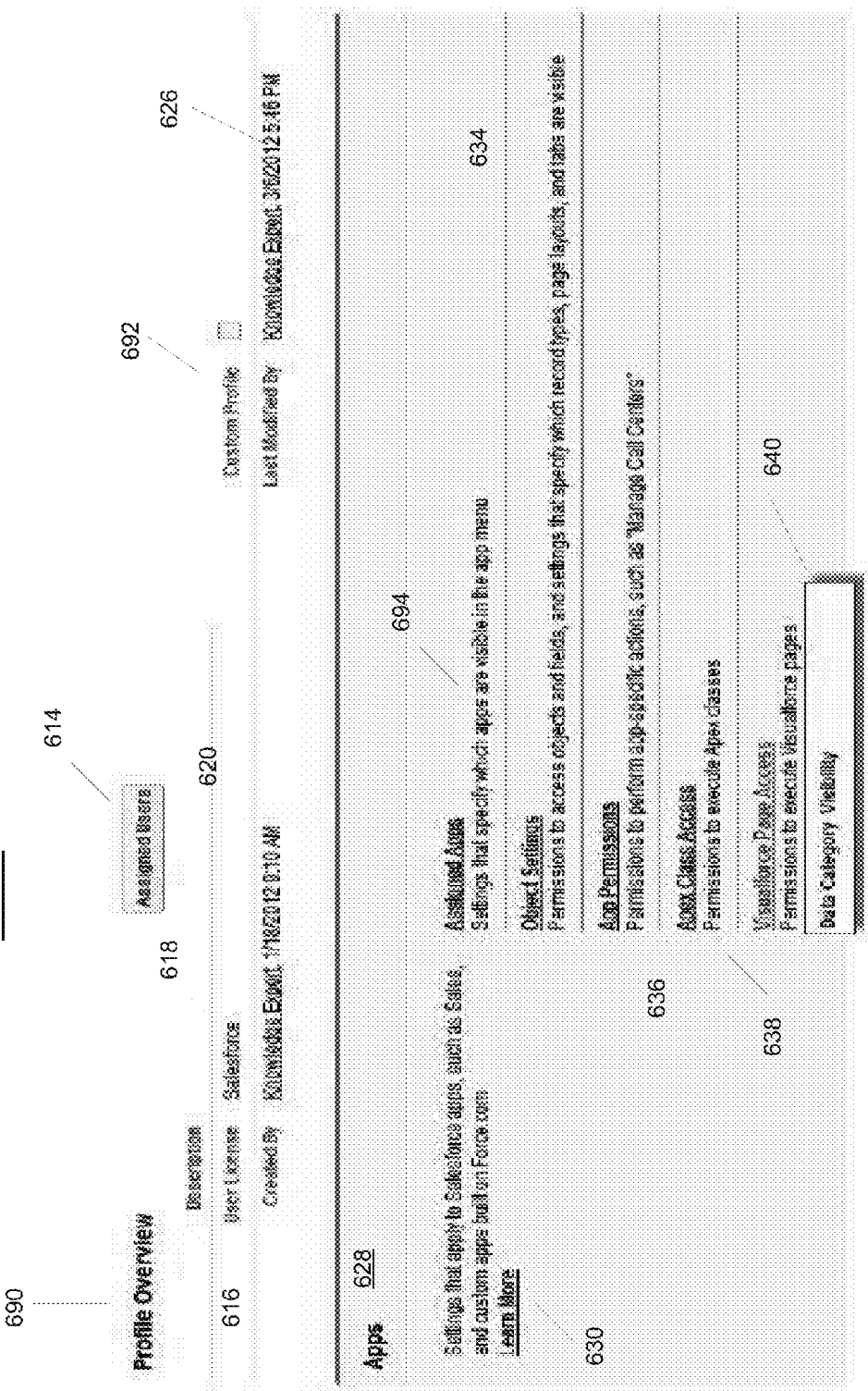

METHODS AND SYSTEMS FOR MANAGING ACCESS TO DATA IN AN ON-DEMAND SYSTEM

CLAIM OF PRIORITY

This application claims the benefit of U.S. Provisional Patent Application 61/702,619 entitled Methods and Systems for Managing Access to Data in an On-Demand System, by Paymal et al., filed Sep. 18, 2012, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending U.S. patent application is related to the present application and is incorporated by reference herein in its entirety: U.S. Provisional Patent Application 61/702,619 entitled Methods and Systems for Managing Access to Data in an On-Demand System, by Paymal et al., filed Sep. 18, 2012.

FIELD OF THE INVENTION

One or more implementations relate generally to a managing access to data system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The quick and efficient retrieval of accurate information and subsequent delivery of this information to the user system has been and continues to be a goal of administrators of database systems.

Unfortunately, conventional database approaches might process a query relatively slowly if, for example, the relationship between the data and user is relatively complex. A database system may also process a query relatively slowly if, for example, a relatively large number of users substantially concurrently access the database system.

Accordingly, it is desirable to provide techniques enabling data category visibility of the database system, and computing the data category visibility based on profile and permission set based access to improve performance and efficiency of the database system.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 6B is a screenshot of a data category visibility page that allows the user to define access to data categories for specific users or groups of users.

FIG. 6E is a screenshot of a profile overview page which determines to what data a user has access.

DETAILED DESCRIPTION

General Overview

Systems and methods are provided for managing access to data in an on-demand system.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing managing access to data in an on-demand system will be described with reference to example embodiments.

The following detailed description will first describe data category visibility in accordance with aspects and embodiments.

Figure 1:
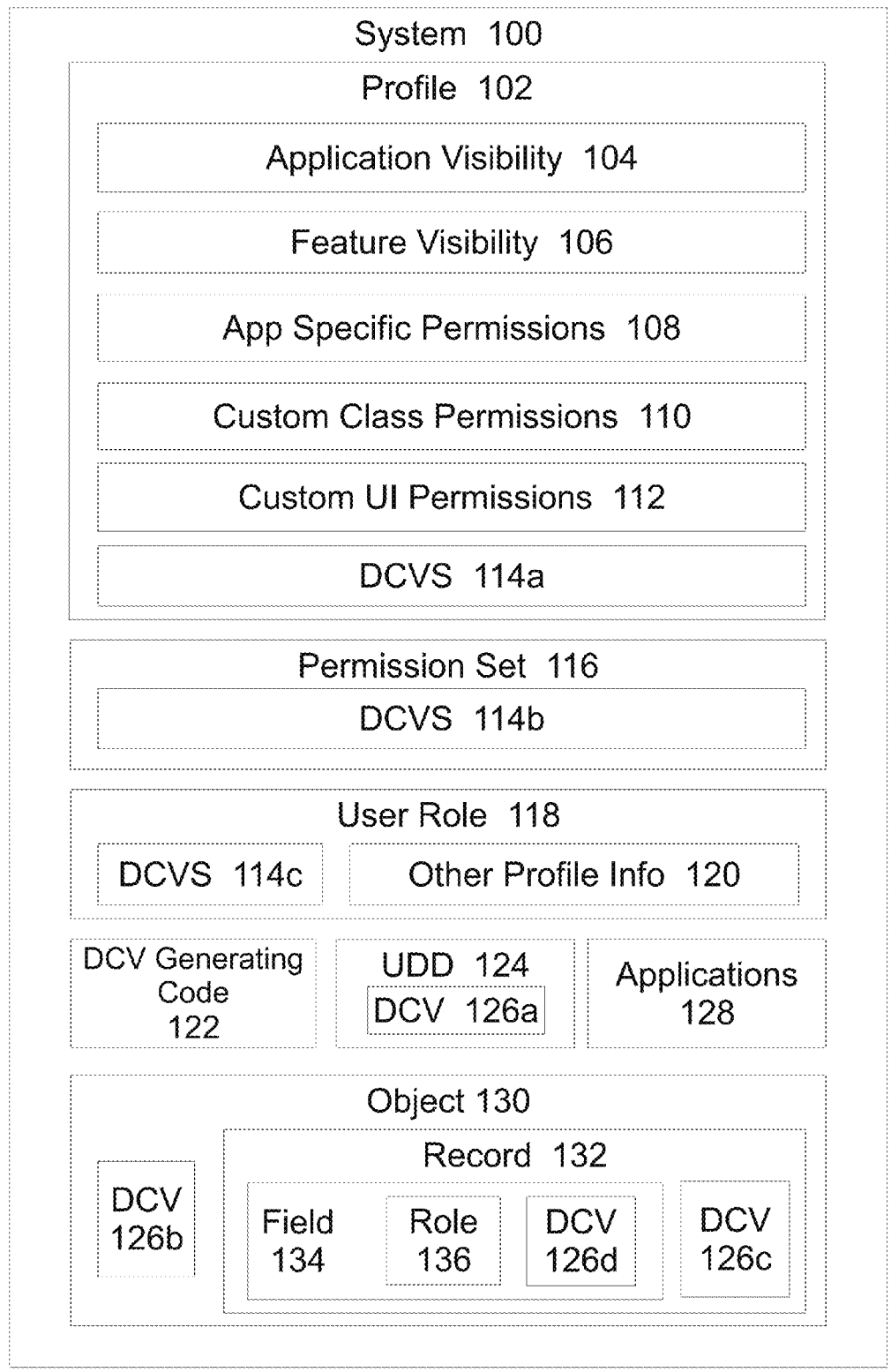
FIG. 1 illustrates a representative system for managing access to data in an on-demand system in an embodiment.

FIG. 1 illustrates a block diagram of an embodiment of system 100 for managing access to data in an on-demand system within a multi-tenant database. System 100 may include profile 102. Profile 102 may include application visibility 104, features visibility 106, app specific permissions 108, custom class permissions 110, custom user interface (UI) permissions 112, and profile data category visibility settings (DCVS) 114a. System 100 may also include permission set 116, which may include permission DCVS 114b and user role 118, which may include role DCVS 114c and other profile information 120. System 100 may also include DCV Generating Code 122 and unified design database (UDD) 124 which may include data category visibility (DCV) 126a. System 100 may also include applications 128, and objects 130, which may include DCV 126b, and records 134. Records 132 may include DCV 126c and fields 134. Fields 134 may include role 136 and DCV 126d. Other embodiments of system 100 may include all of the components listed and/or may include other components.

In one embodiment, system 100 implements a system for managing user access to data within a multi-tenant database. Profile 102 includes a set of fixed permission sets. A profile relates to what position of the user in the organization (e.g., product manager, CEO, salesperson, etc.), where as the role relates to a group within the company (e.g., the North American Team, the Paris team, the red team, etc) A particular user may be assigned a profile based on that user having a particular role. The application visibility 104 is data that may either grant or deny a user permission to view or use a particular software application or software program. Hereinafter, the term "application" may refer to either a software application or a software program. A user without proper permissions may not be able to view or use that particular application. Features visibility 106 is data that may either grant or deny a user permission to view objects, fields, page layouts, tabs and record types. In an embodiment, features visibility 106 may be data labels (e.g., metatags) attached to data to help organize the data to ease user access. For example, data in a multi-tenant database may be stored in certain type of record, which may have a "price" metatag indicating that the data in the record relates to a price of a product or service. Users of the multi-tenant database who do not have authority to access the "price" would not be able to view the records with the price metatag, thus avoiding the display and clutter of unnecessary data and also preventing possible unauthorized changes. The term object may refer to functions, methods, classes, database tables and/or other types of objects and any of the foregoing terms may be substituted for the word object to obtain a specific embodiment.

In an embodiment, one purpose for having app visibility 104 and features visibility 106 would be to prevent users from being able to see and thereby prevent the user access applications and/or data that the user is not authorized to access. Another possible purposes may be to protect the confidentiality of sensitive data and protect sensitive data from unauthorized access or unauthorized changes.

App specific permissions 108 are the permissions within an application that may allow a user access to specific functions within that application. Custom class permissions 110 are permissions that may allow a user to add and execute a custom class made by or for the user. Custom UI permissions 112 are permissions that may allow a user to add or use a particular custom-made user interface (UI). Together, app specific permissions 108, custom class permissions 110, and custom UI permissions 112 are examples of permissions that may allow or restrict a user from accessing data and objects within the multi-tenant database. Being able to allow or restrict user access to app specific permissions 108, custom class permissions 110, and custom UI permissions 112 allows an administrator to prevent users from accessing objects that may be confidential and protect the database from users having the ability to make unauthorized changes. In this specification, "administrators" refers both to those who maintain and/or administer the operations for the entire multi-tenant database or those who maintain and/or administer operation of specific tenants of the multi-tenant database (who may be employees of those tenants, for example).

Data category visibility setting (DCVS) 114a are settings applied to profile 102 that may be used to determine whether a user can view a data category, which may be referred to as determining the visibility of data categories. DCVS 114a may be defined, by an administrator, for each profile 102 and may be used to control which specific data categories are visible to a user. Profile DCVS 114a may be defined on a high volume customer portal (HVCP) or high volume portal user (HVPU) that cannot be assigned any role or whose profile does not allow profile DCVS 114a to be bound to the profile.

System 100 may include permission set 116. Permission set 116 is a set of data that determines what data the user has access. In contrast to profile 102, which has a fixed set of permissions, permission set 116 includes a customizable set of permissions (which may be assigned to one or several users). Within permission set 116 may be DCVS 114b which may be used to determine the visibility of data categories for that one user. The DCVS 114b of permission set 116 may be separate and distinct data from the DCVS 114a of profile 102. One implementation may include a "data category visibility" item in a permission set UI. In an implementation, the activation of the permission of an organization may be reversible.

System 100 may include user role 118. User role 118 may be a programming object or database object that associates a user with a specific role within the multi-tenant database. User role 118, similar to user profile 102, contains or is associated with a fixed set of permissions. However, user roles are assigned to a user based on the functions that the user performs (e.g., accountant, attorney, software engineer, etc.), where as the user profile is assigned to the user based on the user being part of a particular group or set of employees (e.g., the smart phone team might have one profile and the laptop team might have another profile). User role 118 may include role DCVS 114c and other profile information 120. Other profile information 120 may include any other data relevant to a user's role in a multi-tenant database. Within user role 118, an administrator may pre-set role DCVS 114c data so that only certain data categories are visible for users in a specific role. For example, users having "sales" as user role 118 may have visibility to data having the "price" metatag as a result of a setting in role DCVS 114c.

Role DCVS 114c may be separate and distinct data from either or both profile DCVS 114a and permission DCVS 114b. In one implementation, profile DCVS 114a, permission set DCVS 114b, and/or user role DCVS 114c may be combined and/or merged. Hereinafter, DCVS may refer to any one of or any combination of profile DCVS 114a, permission set DCVS 114b, or role DCVS 114c unless specifically noted that only one type of DCVS is being referred to.

Profile DCVS 114*a* may be pre-set and determined by an administrator to prevent users from accessing objects that may be confidential and prevent users from making unauthorized changes. DCVS 114*a* may be applied to permission sets and profiles, which may facilitate segmenting data in a database, where a database is sorted and divided into parts, based on roles. An administrator may specify certain criteria, for example, location or department, and separate out all the data that fits the specified criteria. Data that does not meet the specified criteria is then separated from data that does meet the specified criteria and may not be visible to the user.

DCVS 114*a* may be organized in a hierarchy or tree, where each category may be inclusive of several smaller categories, or subcategories. Subcategories may stand on their own as a separate data category and be divided into further subcategories. DCVS 114*a* may be inherited and propagated through the hierarchy, meaning that a user having access to a certain data category would also have access to the subcategories within that category. For example, location data category Europe would be inclusive of subcategories France, Germany, and England but not China nor Japan. A user having access to "Europe" data category would also have access "France", "Germany" and "England" data categories but would be denied access to "China" and "Japan" data categories. "France" data category may be further divided into subcategories such as "Paris," "Lyon," or "Reims."

In one implementation, system 100 for managing database access may include creating, updating, and deleting DCVS 114*a*. System 100 may also include managing impact of operations done on the category tree on DCVS 114*a*. Changes made to DCVS may be tracked on a page such as "view setup audit trail."

In one implementation, system 100 for managing database access may allow high-level performance by preserving cache mechanism and minimal data keeping. In one implementation, the technology may include functional robustness to preserve the upward propagation of the DCVS 114*a* that belong to an upper functional hierarchy. In addition, the technology may also preserve reversibility by reverting from a new DCVS 114*a* to a previous DCVS 114*a* without impacting the functional behavior or corrupting other stored DCVS 114*a*.

System 100 may include DCV Generating Code 122. DCV Generating Code 122 is used to determine user-access to data. DCV Generating Code 122 may use two or more DCVS to create a combination or union of data. DCV Generating Code 122 may combine a user's DCVS in a given data category tree with another DCVS of a different data category tree. The combination of DCVS may be the combination of two or more DCVS 114*a* from any combination of any DCVS in system 100. For example, profile DCVS 114*a* may be combined with role DCVS 114*c*, but the combination of DCVS may also combine permission DCVS 114*b* with another permission DCVS 114*b*.

Creating a union of data through the combination of two or more DCVS may result in efficient data retrieval and increased system performance. Data may be stored within several data categories and creating a union of data before retrieving the actual data prevents retrieving the same data multiple times. DCV Generating Code 122 determines the most inclusive allowed data category (the highest point in a data category hierarchy or tree) and uses that data category in creating a union of data to create a combination of most inclusive data categories. After the combination is created, the corresponding data is retrieved and displayed to the user. Data that may be stored in multiple different data categories would be retrieved only once instead of multiple times if the combination were not created beforehand. In one implementation, using DCV Generating Code 122 to merge DCVS may remove logic redundancy between languages such as Java and PLSQL as well, also increasing performance.

In one implementation, system 100 is for managing database access and may include a category access cache mechanism by preserving the per-profile and per-role caching mechanism and introducing a per-permission-set caching logic results in a reduction in memory usage, by caching a minimal set of data. System 100 may create a cached object for category access for new users. Caching a new object (e.g., caching a category access for new users) allows the system to preserve resources by obviating the need for multiple instances of language merging when per-profile and per-role category access processes are performed and the relevant data is retrieved from the database.

In another implementation, system 100 for managing database access maintains the functional integrity of the existing DCVS 114*a* approach, as well as has a minimal impact on the scalability and performance of the whole data category related features such as categorization and per-category filtering. DCVS 114*a* inheritance and propagation to subcategories may be defined on a data category to ensure that a category always has access to data associated with a subcategory. For example, system 100 may have role DCVS 114*c* "engineer" and role DCVS 114*c* "engineering manager" where "engineer" may be defined in UDD 124 as a subcategory of "engineering manager" Inheritance may be defined in role DCVS 114*c* "engineering manager" so that data associated with subcategory role DCVS 114*c* "engineer" would be automatically accessible to role DCVS 114*c* "engineering manager" and any data associated with role DCVS 114*c* "engineer" would be accessible to users with role DCVS 114*c* "engineering manager". The reverse would not be true—data associated with role DCVS 114*c* "engineering manager" would not automatically be available to "engineer".

In another implementation, system 100 for managing database access may also provide a set robust and well-defined rules included in DCV Generating Code 122 specifying how to functionally handle several DCVS 114*a* and persist them in an efficient and robust way in the database.

System 100 may include unified data dictionary (UDD) 124, which may also be referred to as unified design database or universal data dictionary. UDD 124 is a block of data which includes definitions for specific entities. Definitions may include basic information, fields, dependencies, metadata, and standard or custom objects. DCV 126*a* is the outcome of combining any DCVS using DCV Generating Code 122, as described above, stored as data in UDD 124. After DCV 126*a* is determined using DCV Generating Code 122, system 100 may use to determine what data categories will be visible to users. Any change to any DCVS within system 100 may affect DCV 126*a* in that DCV Generating Code 122 may need to be recalculated to determine DCV 126*a*.

In one implementation, system 100 for managing database access may include creating a new organization permission-set behind which the system or method may be hidden. The UDD definition of category access may be updated so that permission set 116 based access may be supported in addition to user role 118 and profile 102 based access. Any conditions or requirements which need to be met before a user is allowed access are removed so that profile DCVS 114*a* may be set on any type of profile 102, permission set DCVS 114*b* and profile DCVS 114*a* are defined, and the data category tree is updated to ensure that the newly introduced permission set DCVS 114b is located under the correct parent in the data category tree.

System 100 may include applications 128, which may be applications that a user may or may not have access to, depending on permissions. Applications 128 may or may not be visible to users depending on a user's DCV 126a.

System 100 may include object 130, which may include files, functions, elements, methods, classes, or tables. Object 130 in system 100 allows for inheritance, where a category-subcategory relationship may be established between different objects and the relationship establishes a hierarchy between objects 130. For example, B may be defined as a subcategory of A. Accordingly, any data included in subcategory B is necessarily also part of category A and thus data included within subcategory B is inherited by subcategory A.

DCV 126b and record 132 are data that may be part of or used by object 130. Within record 132, field 134 and DCV 126c are types of data that may be part of or used by record 132. Role 136 and DCV 126d in turn are attributes of field 134. Together, DCV 126b, 126c, and 126d, record 132, field 134, and role 136 are types of data within object 130 and determine the visibility of object 130 to a user.

Figure 2A:
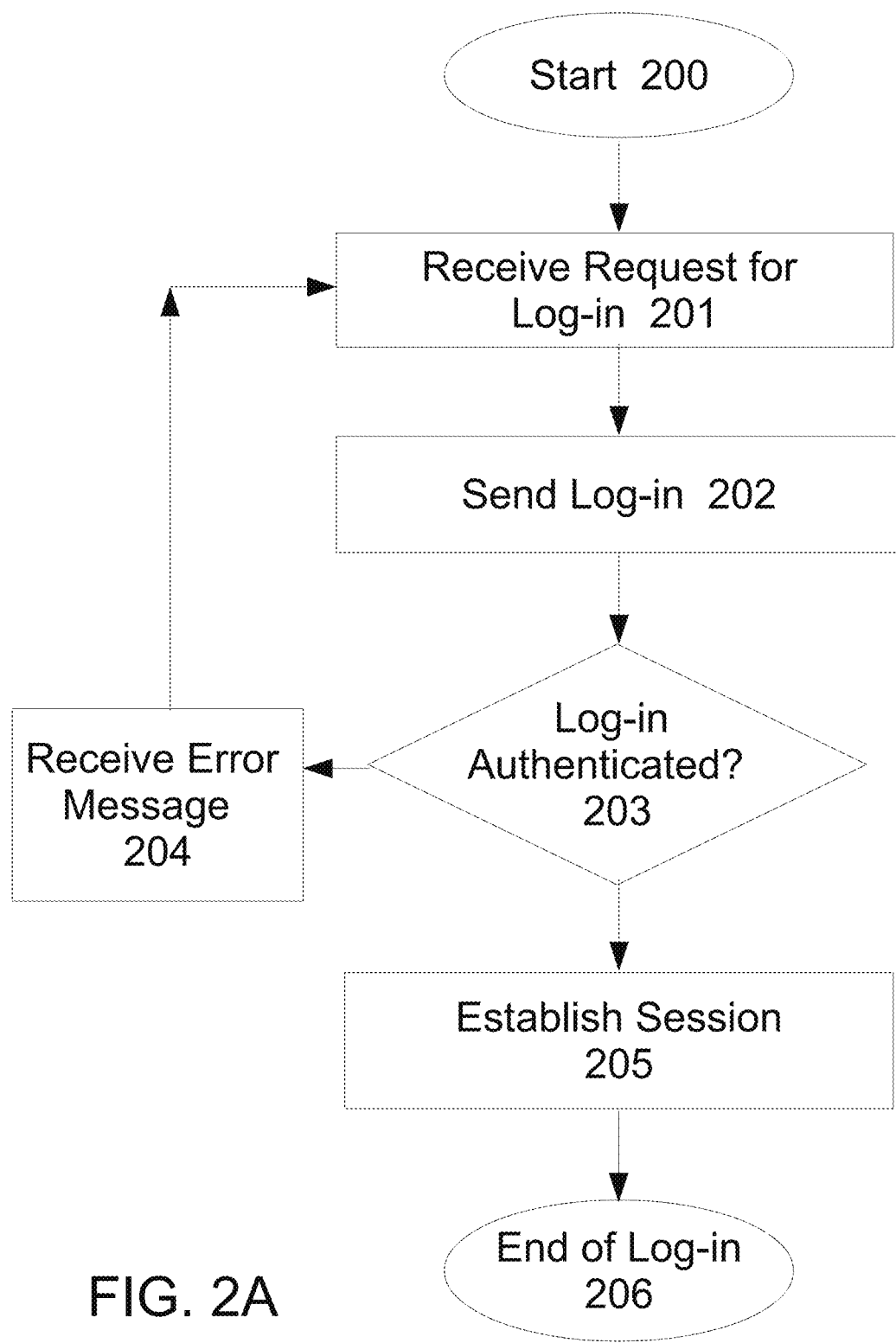
FIGS. 2A-2B are flow diagrams illustrating tenant and server side processes for authenticating a user for access into a multi-tenant database system.

FIG. 2A is a flow diagram illustrating a tenant process 200 for authenticating a user to a multi-tenant database. In an embodiment, a user may be authenticated before being allowed to access a multi-tenant database. Authentication allows the system 100 of the multi-tenant database to recognize the user and associate the correct data within system 100 with the user. Authentication also ensures that un-authorized users cannot access the multi-tenant database. In step 201, a user receives a request to log into data. In step 202, the user submits login data, and in step 203 the data may be either authenticated or denied. If denied, tenant process 200 proceeds to step 204 where the user may receive an error message and may receive another request to log into data, repeating step 201. If the user is authenticated, method 200 proceeds to step 205. In step 205, a session is established and the tenant process for the user login authentication is complete 206.

In another embodiment, although depicted as distinct steps in FIG. 2A, steps 201-205 may not be distinct steps. In other embodiments, not all of the above steps may be included and/or other steps may be performed in addition to, or instead of, those listed above. The steps may be performed in another order.

Figure 2B:
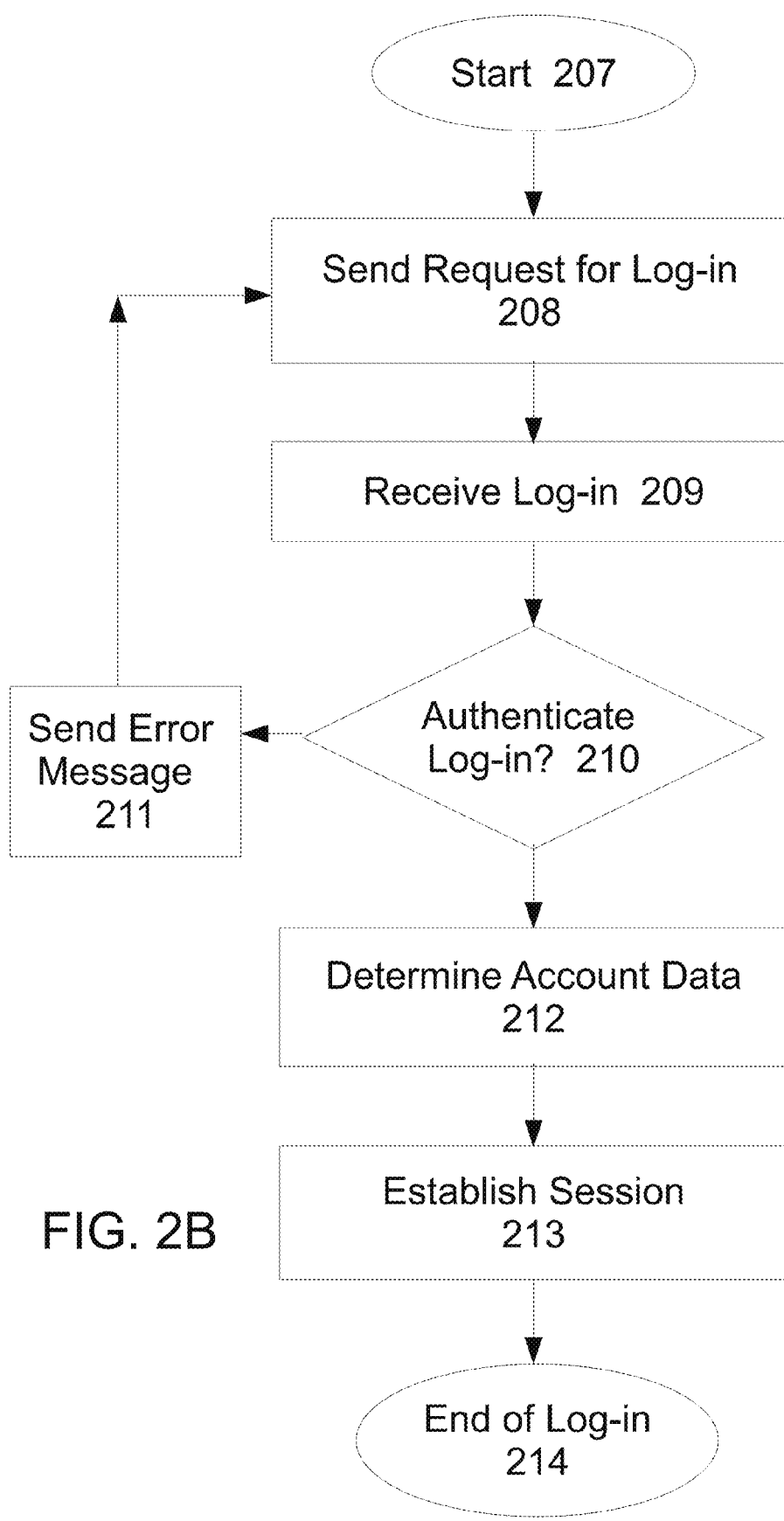

FIG. 2B is a flow diagram illustrating the server process 207 for authenticating a user to a multi-tenant database. In the authentication server process, the server starts in step 209 by sending a request for log-in data. In step 210, the server receives log-in data from the user and in step 211 attempts to authenticate the user. During authentication, the server may compare the log-in data provided by the user to data stored within the multi-tenant database. If the log-in data provided by the user matches data within the multi-tenant database, the server authenticates the user.

In step 212, if the log-in data provided by the user does not match data within the multi-tenant database, the server will send an error message to the user and the method will repeat step 209. If the user is authenticated in step 211, method 207 proceeds to step 213 and determines data about that specific user's account within the multi-tenant database. During step 213, system 100 may load data associated with that specific user, for example profile 102, profile DCVS 114a, permission set 116, user role 118, DCV 126a, or any combination of the aforementioned, including data not specifically mentioned here. After a user's account data is determined in step 213, the method proceeds to step 214 and the server will establish a session with the tenant and log-in authentication is complete.

In another embodiment, although depicted as distinct steps in FIG. 2B, steps 208-214 may not be distinct steps. In other embodiments, not all of the above steps may be included and/or other steps may be performed in addition to, or instead of, those listed above. The steps may be performed in another order.

Figure 3A:
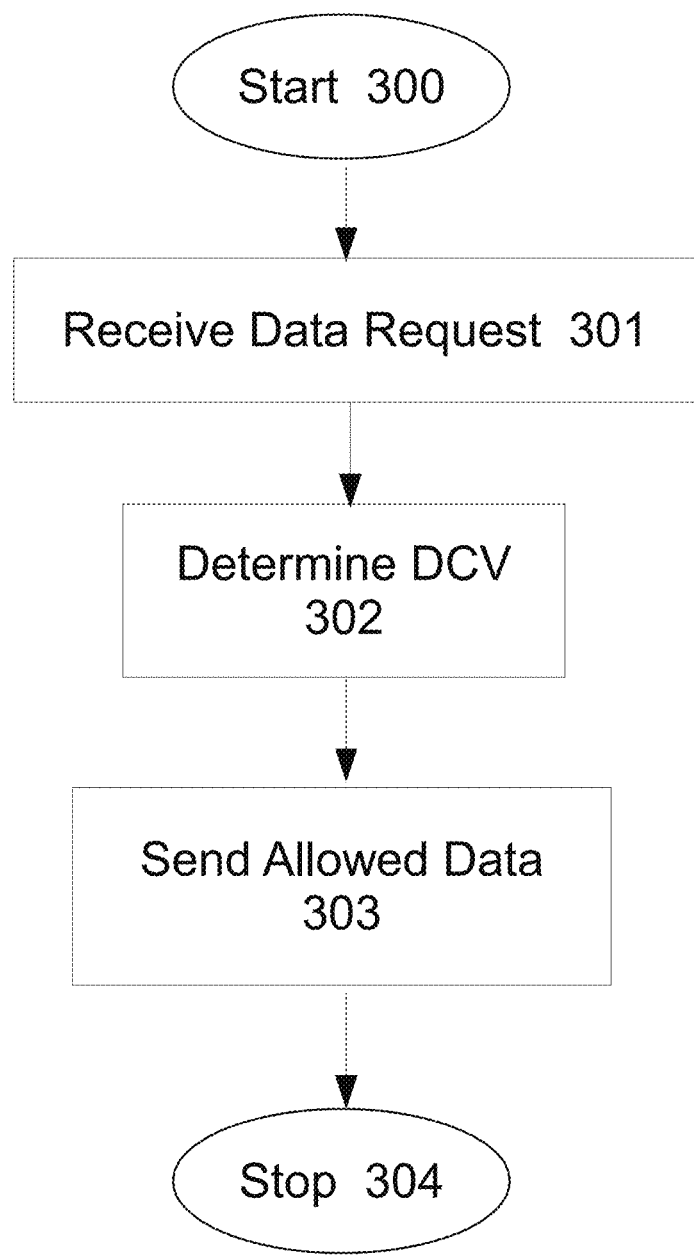
FIGS. 3A-3B are flow diagrams illustrating tenant and server side processes for sending and receiving data within a multi-tenant database system.

FIG. 3A is a flow diagram illustrating server process 300 of receiving a request for data. In step 301, the server receives a request for data, and in step 302 determines a user's DCV 126a using DCVS and DCV Generating Code 122. DCVS may be profile DCVS 114a, permission DCVS 114b, role DCVS 114c or any combination of DCVS within system 100. After determining a user's DCV in step 302, the method proceeds to step 303 where the server sends the allowed data to the user and completing the process.

In another embodiment, although depicted as distinct steps in FIG. 3A, steps 301-303 may not be distinct steps. In other embodiments, not all of the above steps may be included and/or other steps may be performed in addition to, or instead of, those listed above. The steps may be performed in another order.

Figure 3B:
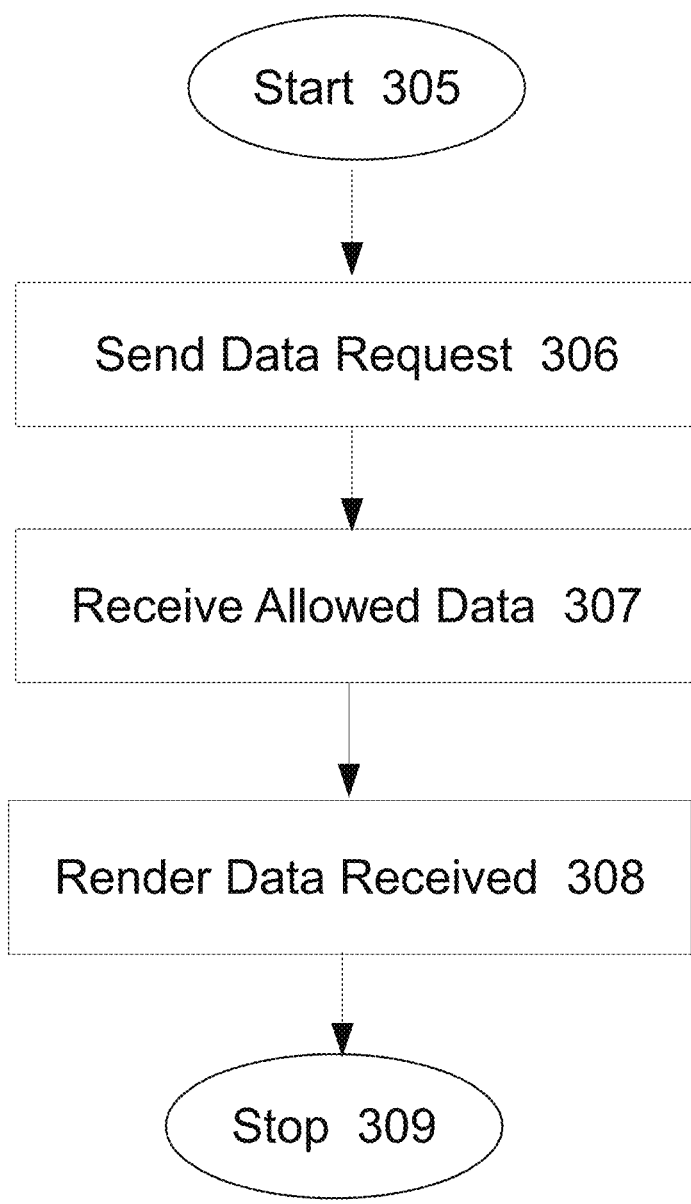

FIG. 3B is a flow diagram illustrating tenant user process 305 of sending a request for data. In step 307, the tenant user sends a request for data. The server will determine the data the user is allowed to receive using process 300. In step 308, the user receives the data allowed to him. The method continues to step 309, where the data is rendered and processed to be presented to the user in a user-friendly display. The process is then complete.

Figure 4:
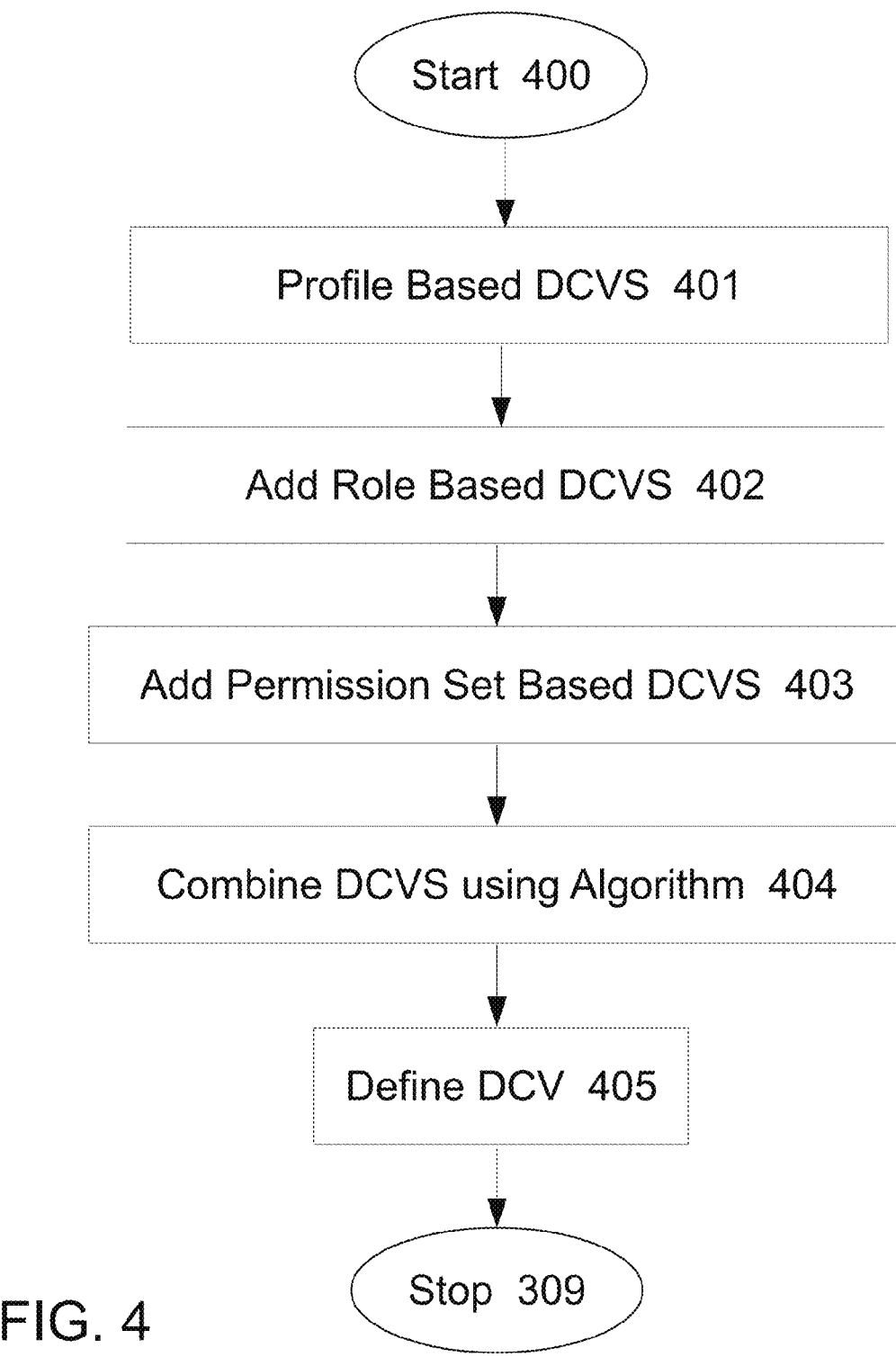
FIG. 4 is a flow diagram illustrating a method for managing user access to data within a multi-tenant database system.

In another embodiment, although depicted as distinct steps in FIG. 3B, steps 307-309 may not be distinct steps. In other embodiments, not all of the above steps may be included and/or other steps may be performed in addition to, or instead of, those listed above. The steps may be performed in another order FIG. 4 is a flow diagram illustrating a method 400 for managing user access to data in an on-demand system in an embodiment. As shown in FIG. 4 (and described above), a user has a profile DCVS 114a data as part of his profile 102. Profile DCVS 114a may be combined with permission DCVS 114b in step 402 and role DCVS 114c is added in step 403. In step 403, profile DCVS 114a, permission DCVS 114b, and role DCVS 114c are combined using DCV Generating Code 122 to determine a user's DCV 126a.

In another embodiment, although depicted as distinct steps in FIG. 4, steps 401-403 may not be distinct steps. In other embodiments, not all of the above steps may be included and/or other steps be performed in addition to, or instead of, those listed above. The steps may be performed in another order. For example, profile based DCVS 401 may be added to permission set based DCVS 403 and role based DCVS 402 may be excluded in calculating a user's DCV 126a.

Figure 5:
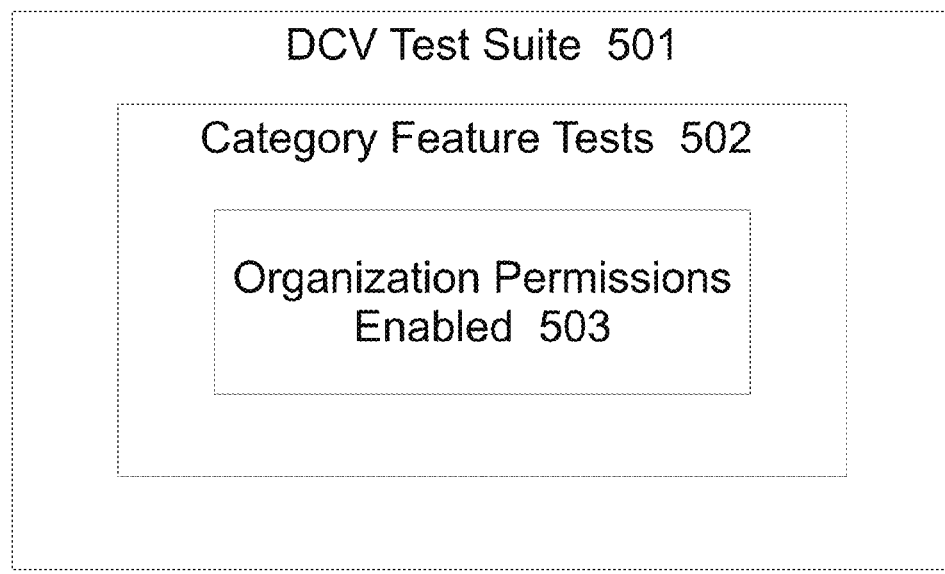
FIG. 5. Illustrates a representative system of a DCV test suite.

FIG. 5 illustrates an implementation of the system wherein a new DCV test suite 501 may be created that runs all the existing category feature tests 502 by adding category feature tests 502 to the suite. Category feature tests are tests that test data category related features. Category feature tests are wrapped in a test wrapper that enables organization permissions 503 created earlier.

Figure 6A:
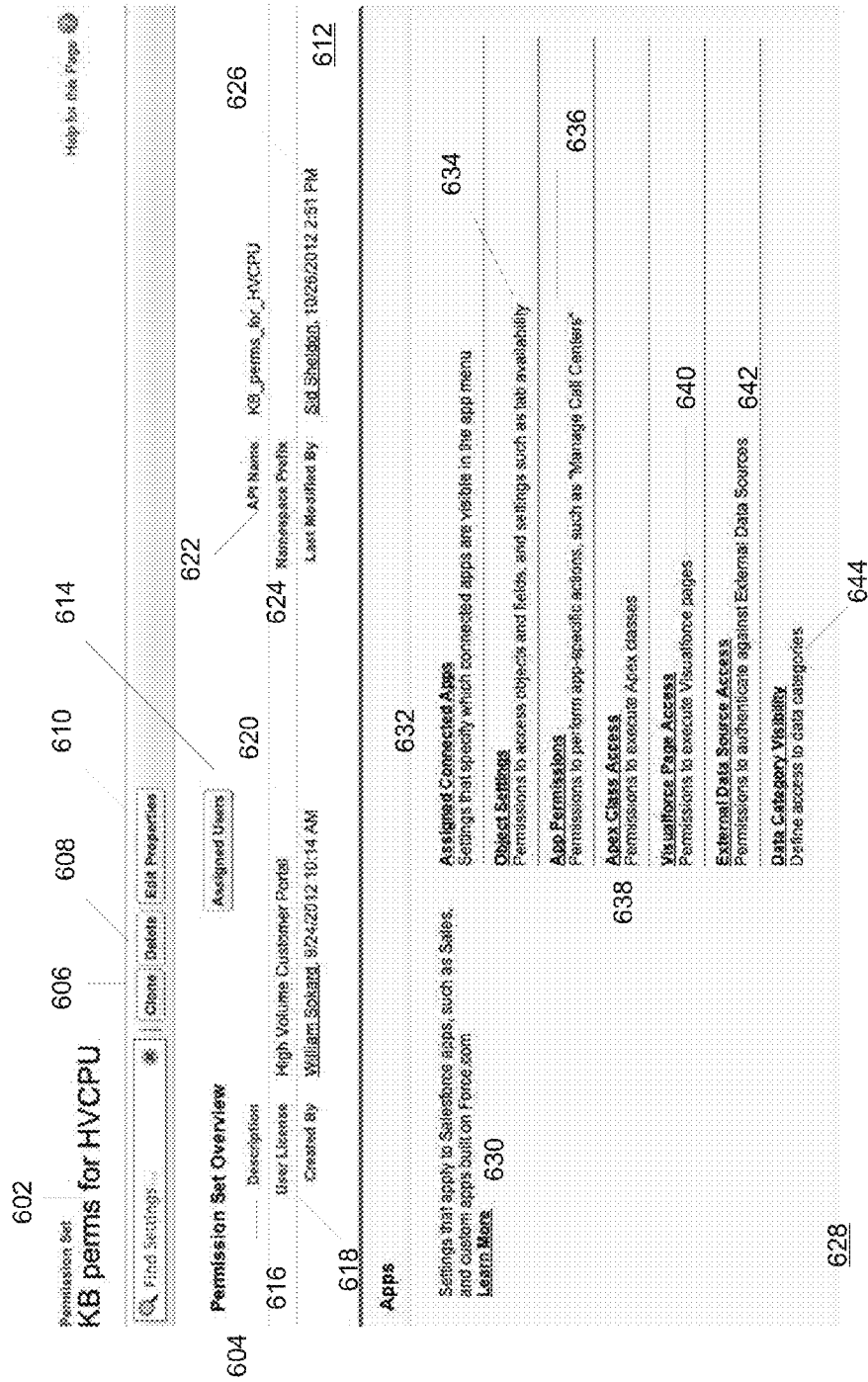
FIG. 6A is a screenshot of a permission set page that determines to what data a user has access.

FIG. 6A is a screenshot of a permission set page 600A. The permission set page contains: navigation header 602; search bar 604; tool buttons 606, 608 and 610; permission set identifiers 612, which itself contains user group selector 614, description 616, user license 618, creator identifier 620, API title 622, namespace identifier 624, and last modification identifier 626; Apps setting portlet 628, which itself contains help link 630, and the following settings links-assigned connected apps 632, object settings 634, app permissions 636, apex class access 638, custom-UI-access 640, external data source access 642, and data category visibility 644. In other embodiments permission set page 600A may have additional components and/or may not have all components listed above.

Permission set page 600A determines to what data a user has access. Navigation header 602 identifies the user data access control page that the user is currently viewing. Search bar 604 allows the user to find specific settings, which can then be altered. Tool button clone 606, when selected, causes a permission settings file that currently selected to be cloned. Tool button delete 608, when selected, causes a permission settings file currently selected to be deleted. Tool button edit properties 610, when selected, allows the user to edit the properties of any permissions settings file currently selected. Permission set identifiers 612 is a header region that contains information pertaining to the permission set currently being viewed. User group selector 614 allows the user to change between the user, or groups of users, whose permissions sets the current user wishes to view, modify or delete. Description 616 may or may not contain a brief description of the user group selected. User License 618 refers to the type of user license the tenant has with the multi-tenant database system (e.g. High Volume Customer Portal). Different levels of service may be associated with different type of licenses. Created by 618 displays the username of the user who created the permission settings for the currently selected user or user group. API title 622 is the title of the Application Program Interface (API) for which permissions sets are being created or modified. The Application Program Interface may include a set of function calls to an application, such as a database. Functions within the application may be called, by placing the function calls in code, which may be located remotely from the application. However, if the user is not granted the appropriate permission, via the permission sets, the function calls of the API will not work. Namespace identifier 624 contains the object name prefix, if one has been used to avoid a name conflict with a similarly named object within the database. Last modification identifier 626 displays the user name of the last user to modify the user or user group permissions currently being viewed or modified.

Apps setting portlet 628 is a region, which may be a box, within permission set page 600A which contains links to various settings page where settings can be viewed or modified. Help link 630 links the user to a page with more information about the settings that can be edited and the different apps available on the multi-tenant database system. Assigned connected apps 632 takes the user to a settings page where the user can view or modify specifically which connected apps are visible to specific users or groups of users in the apps menu for the tenant's webpage. Object settings 634 takes the user to a settings page where the user can view or modify permissions related to objects and fields within the tenant's space in the multi-tenant database system, as well as settings related to tab availability for other users or groups of users. Apps permissions 636 takes the user to a page where the user can view or modify permissions related to performing app-specific actions. Apex class access 638 takes the user to a page where the user can view or modify permissions related to specific users or groups of users executing Apex classes. Custom-UI-access 640 takes the user to a page where the user can view or modify permissions related to specific users or groups of users executing pages of a custom-user-interface builder, such as the pages of Salesforce.com's Visualforce. External Data Source Access 642 takes the user to a page where the user can view or modify permissions related to specific users or groups of users authenticating against external data sources. Data category visibility 644 takes the user to a page where the user can define access to data categories for specific users or groups of users.

FIG. 6B is a screenshot of data category visibility page 600B. Data category visibility page 600B contains navigation header 602, search bar 604, tool buttons 606, 608 and 610, secondary navigation header 646, category group visibility settings table 648, action column 650, category group column 652, visibility column 654, and visibility details 656. In other embodiments data category visibility page 600B may have additional components and/or may not have all components listed above.

Navigation header 602, search bar 604 and tool buttons 606, 608 and 610 serve an identical function as discussed earlier in conjunction with FIG. 6A. Secondary navigation header 646 shows the page location in the context of the link followed. As seen in FIG. 6B, because Data Category Visibility originated within the Permission Set Overview page in the secondary navigation header 646, Data Category Visibility is listed as a subset of that webpage (showing Permission Set Overview>Data Category Visibility, with the greater than sign indicating direction of travel).

Data category visibility page 600B is the same as data category visibility 644 in FIG. 6A. Data category visibility page 600B allows the user to define access to data categories for specific users or groups of users. Secondary navigation header 646 also contains a drop down menu allowing the user to navigate to other pages within the apps setting portlet 628 shown in FIG. 6A.

Category group visibility settings 648 is a table that lists information about data visibility settings for different category groups, which can be edited by the user to alter the settings. Action column 650 is a column within category group visibility settings 648 on page 600B, which allows the user to edit the category group visibility settings. Each row in action column 650 includes a link for editing the category group visibilities settings of the same row. Action column 648 contains an active link button which, when selected, may take the user to a page where the settings for group on the associated row of the table may be edited. Alternatively, selecting the edit link of action column 648 may allows the user to directly edit the settings in the same row as the edit link selected in Category group visibility settings 648 without switching webpages. Category group column 652 lists each of the different category groups within category group visibility settings 648. Visibility column 654 lists the visibility setting for the category group on the associated row of category group visibility settings 648. Visibility details column 656 displays a description of the type of visibility settings applied to the category group on the associated row of category group visibility settings 648.

Figure 6C:
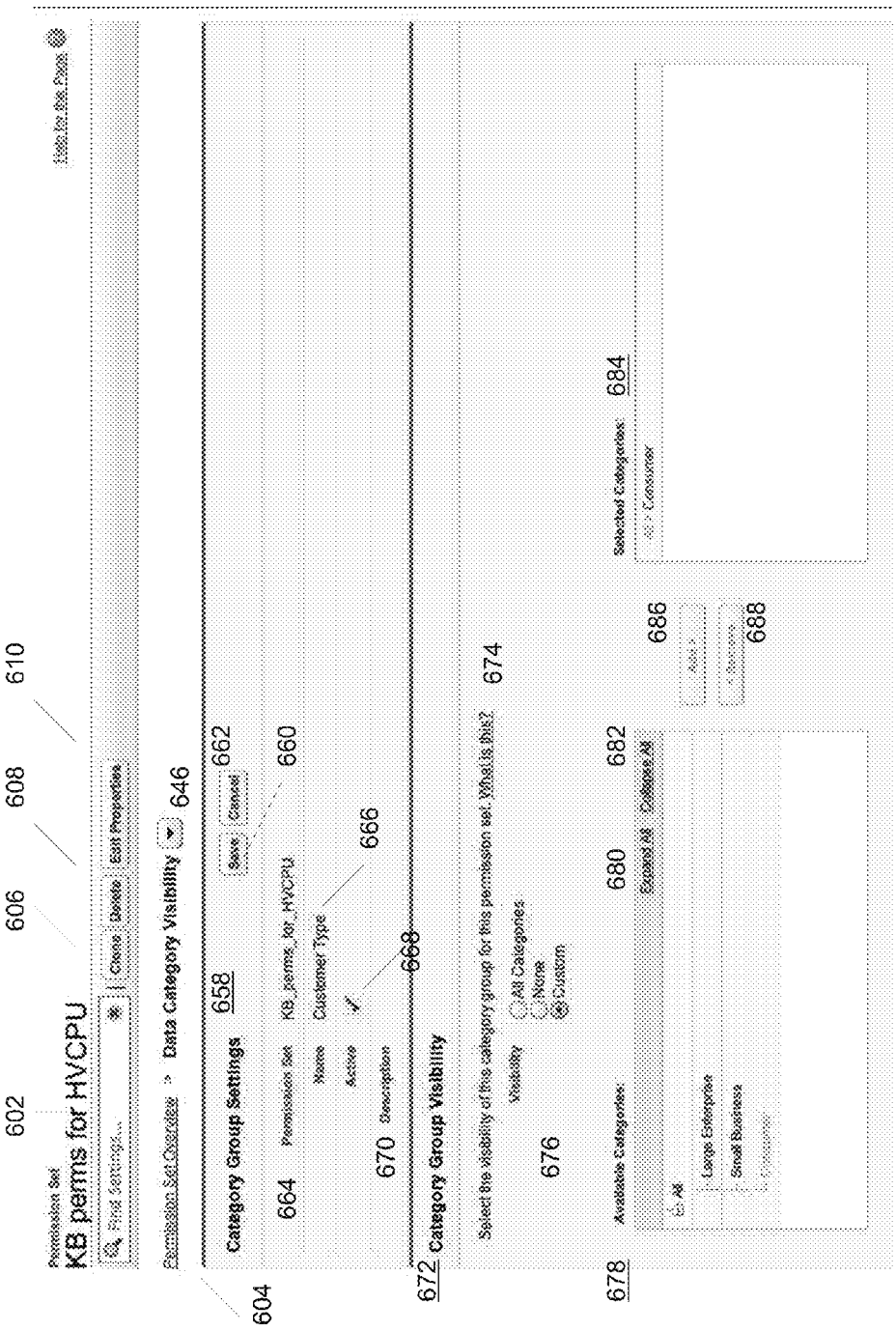
FIG. 6C is a screenshot of a category group settings page that allows the user to edit category group visibility settings.

FIG. 6C is a screenshot of category group settings page 600C. Category group settings page 600C contains navigation header 602, search bar 604, tool buttons 606, 608, and 610, secondary navigation header 646, category group settings region 658, save button 660, cancel button 662, permission set identifier 664, name identifier 666, activity indicator 668, description identifier 670, category group visibility region 672, help button 674, visibility selector 676, available categories box 678, expand all button 680, collapse all button 682, selected categories box 684, add button 686, and remove button 688. In other embodiments category group settings page 600C may have additional components and/or may not have all components listed above.

Settings page 600C is the editable page linked from category group visibility settings table 648 of FIG. 6B and accessible through the edit button in action column 650.

Navigation header 602, search bar 604 and tool buttons 606, 608 and 610, and secondary navigation header 646 serve an identical function as discussed earlier in conjunction with FIG. 6A. Category group settings 658 is a region on the settings page 600C, which may be a region on settings page 600C (e.g., a box) that contains descriptions of the category group being edited. Save button 660 saves the category group settings as currently changed. Cancel button 662 discards all of the current changes to a category group without saving the changes. Permission set identifier 664 displays the title of the permission set being viewed or edited. Name identifier 666 displays the name of the category group being viewed or edited. Activity indicator 668 indicates whether the category group being edited is currently in use by the tenant. For example, a check mark may be used to indicate that the group category is currently in use. Description identifier 670 is a field that may display a further description of the category group currently being viewed or edited. In the example of FIG. 6C, the description field is blank.

Category group visibility region 672 is a region on settings page 600C, which may be a region of settings page 600C (e.g., a box) that displays the current visibility settings for the selected category group and allows the user to edit the category group visibility settings. Help button 674 is a link, which when activated, takes the user to a page that explains what the different visibility settings for a given permission set mean. Visibility selector 676 allows the user to select one of three visibility settings (All Categories, None, or Custom). Available categories box 678 allows the user to select which categories will be visible to the selected category group when the user selects the "Custom" setting using visibility selector 676. Available categories box 678 contains an explorable list that includes all the available categories which can be selected. In an embodiment available categories box 678 does not appear unless "custom" is selected in visibility selector 676. In an alternative embodiment, available categories box 678 may be replaced with a drop down menu. Expand all button 680 expands the explorable directory to make all categories visible and selectable. Collapse all button 682 collapse the explorable directory to make only the top level file visible (the "All" folder, as seen in the screenshot). The user selects the category, which may correspond to a file that is read by a program to determine which categories are visible. Selected categories box 684 displays all of the data categories selected for viewing by the selected category group. Add button 686, which is currently greyed out in the screenshot, can be used to move a selected category from available categories box 678 to selected categories box 684 box which would, when saved, allow the selected category group to view that data category. The user first selects a category from available categories 678, which causes add button 684 to no longer be greyed out. Then, the user selects the add button 686, which causes the selected category to move to the selected categories box 684. Remove button 688, which is currently greyed out in the screenshot, can be used to move a selected category from selected categories box 684 back to available categories box 678 which would, when saved, prevent the selected category group from viewing that data category. When there is at least one category in the selected categories box 684, remove button 688 is not greyed out.

Figure 6D:
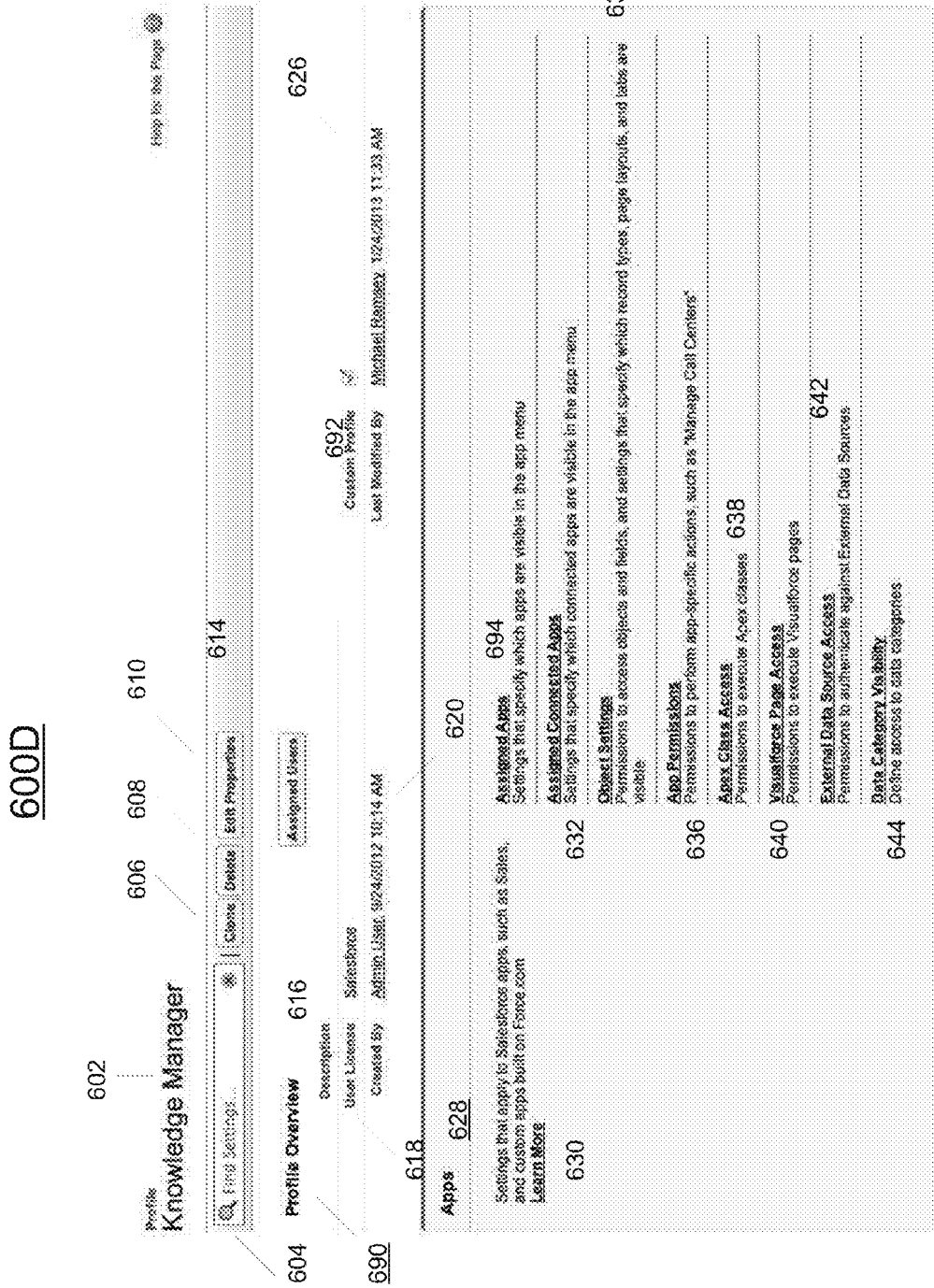
FIG. 6D is a screenshot of a profile overview page that determines to what data a user has access.

FIG. 6D is a screenshot of profile overview page 600D. The profile overview page 600D includes navigation header 602, search bar 604, tool buttons 606, 608 and 610, profile overview region 690, user group selector 614, description identifier 616, user license 618, creator identifier 620, custom profile indicator 692, last modification identifier 626, apps setting portlet 628, help link 630, and the following settings links-assigned apps 694, assigned connected apps 632, object settings 634, app permissions 636, apex class access 638, custom-UI-access 640, external data source access 642, and data category visibility 644. In other embodiments profile overview page 600D may have additional components and/or may not have all components listed above.

The settings on page 600D determine to which data a user has access. Navigation header 602, search bar 604, tool buttons 606, 608 and 610 perform identical functions as described in conjunction with FIG. 6A. Profile overview region 690, which may be in the shape of a box, includes information describing the profile currently selected. User group selector 614, description identifier 616, user license 618, creator identifier 620 and last modification identifier 626 perform identical functions are described in conjunction with FIG. 6A. Custom profile indicator 692 displays an indication (e.g., a check mark) as to whether the profile currently being viewed or modified is a custom, or non-preset profile.

Apps setting portlet 628, help link 630, assigned connected apps 632, object settings 634, app permissions 636, apex class access 638, custom-UI-access 640, external data sources access 642 and data category visibility 644 are described in conjunction with FIG. 6A. Assigned apps 694 takes the user to a settings page where the user can view or modify specifically which apps are visible to the profile group in the apps menu for the tenant's webpage.

FIG. 6E is a screenshot of profile overview page 600E. The profile overview page 600E contains profile overview region 690, user group selector 614, description identifier 616, user license 618, creator identifier 620, custom profile indicator 692, last modification identifier 626, apps setting portlet 628, help link 630, and the following settings links-assigned apps 694, object settings 634, app permissions 636, apex class access 638, custom-UI-access 640. In other embodiments profile overview page 600E may have additional components and/or may not have all components listed above.

The settings on page 600E determine to which data a user has access. Profile overview region 690, which may be in the shape of a box, includes information describing the profile currently selected. User group selector 614, description identifier 616, user license 618, creator identifier 620 and last modification identifier 626 perform identical functions as described in conjunction with FIG. 6B. Custom profile indicator 692 displays an indication (e.g., a check mark) as to whether the profile currently being viewed or modified is a custom, or non-preset profile.

Apps setting portlet 628, help link 630, object settings 634, app permissions 636, apex class access 638, custom-UI-access 640, are described in conjunction with FIG. 6A. Assigned apps 694 takes the user to a settings page where the user can view or modify specifically which apps are visible to the profile group in the apps menu for the tenant's webpage.

Figure 6F:
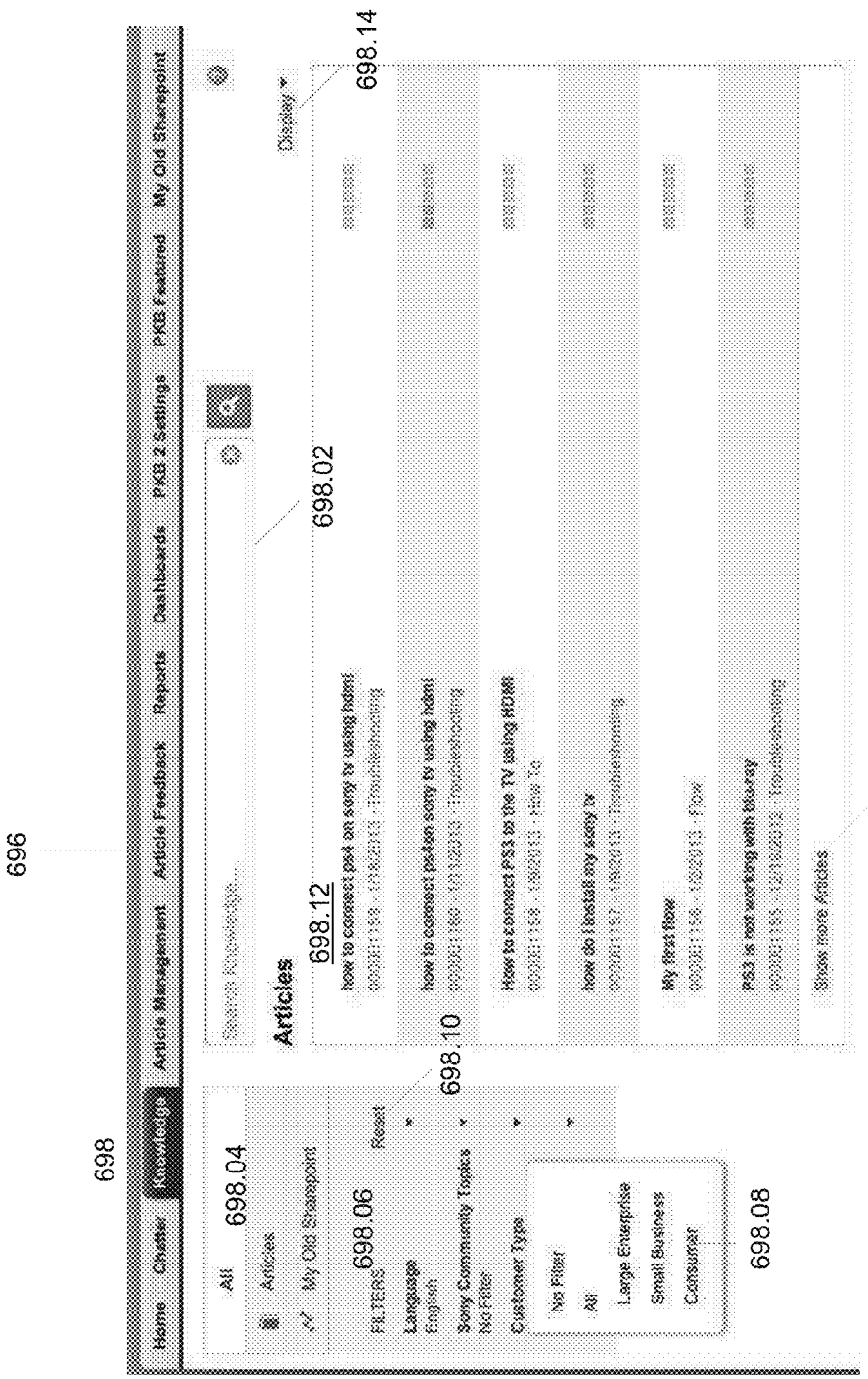
FIG. 6F is a screenshot of a knowledgebase page.

FIG. 6F is a screenshot of knowledgebase page 600F. Knowledgebase page 600F contains navigation bar 696, knowledge tab 698, search bar 698.02, page category selector 698.04, filters 698.06, filter box 698.08, reset button 698.10, articles 698.12, display button 698.14, and articles link 698.16. In other embodiments knowledge base page 600F may have additional components and/or may not have all components listed above.

Knowledgebase page 600F displays articles, which can be searched and filtered. Navigation bar 696 is a bar that displays different tabs, each linking to a different part of the tenant's portion of the multi-tenant database, hosted on the multi-tenant database. Knowledge tab 698 is a tab, which when selected, brings the user to a webpage where the user can search for articles, filter and browse search results, and click on a link taking them to specific articles. Search bar 698.02 is a text box in which a search string can be entered, and in response to entering the search term, the system will search for the given string in the database. Page category selector 698.04 allows the user to select whether the user wants the search to display all results, or just return articles. Filters 698.06 is a filtering tool that allows the user to select between various filters, such as language, category, customer types, etc. Filter box 698.08 displays an example of what comes up when a filter is selected for use (displaying the different customer types under the "Customer Type" filter in filters 698.06). Reset button 698.10 allows the user to clear all currently enabled filter and return the search query to an unfiltered state. Articles 698.12 is a listing of all the search results turned up by the search entered in search bar 698.02, as filtered by page category selector 698.04 and filters 698.06. Display 698.14, when selected, offers to the user choice of how many search results will appear on the page and/or changes the order in which the articles are displayed. Articles link 698.16 is a link which, when selected, displays additional articles retrieved by the search query.

System Overview

Figure 7:
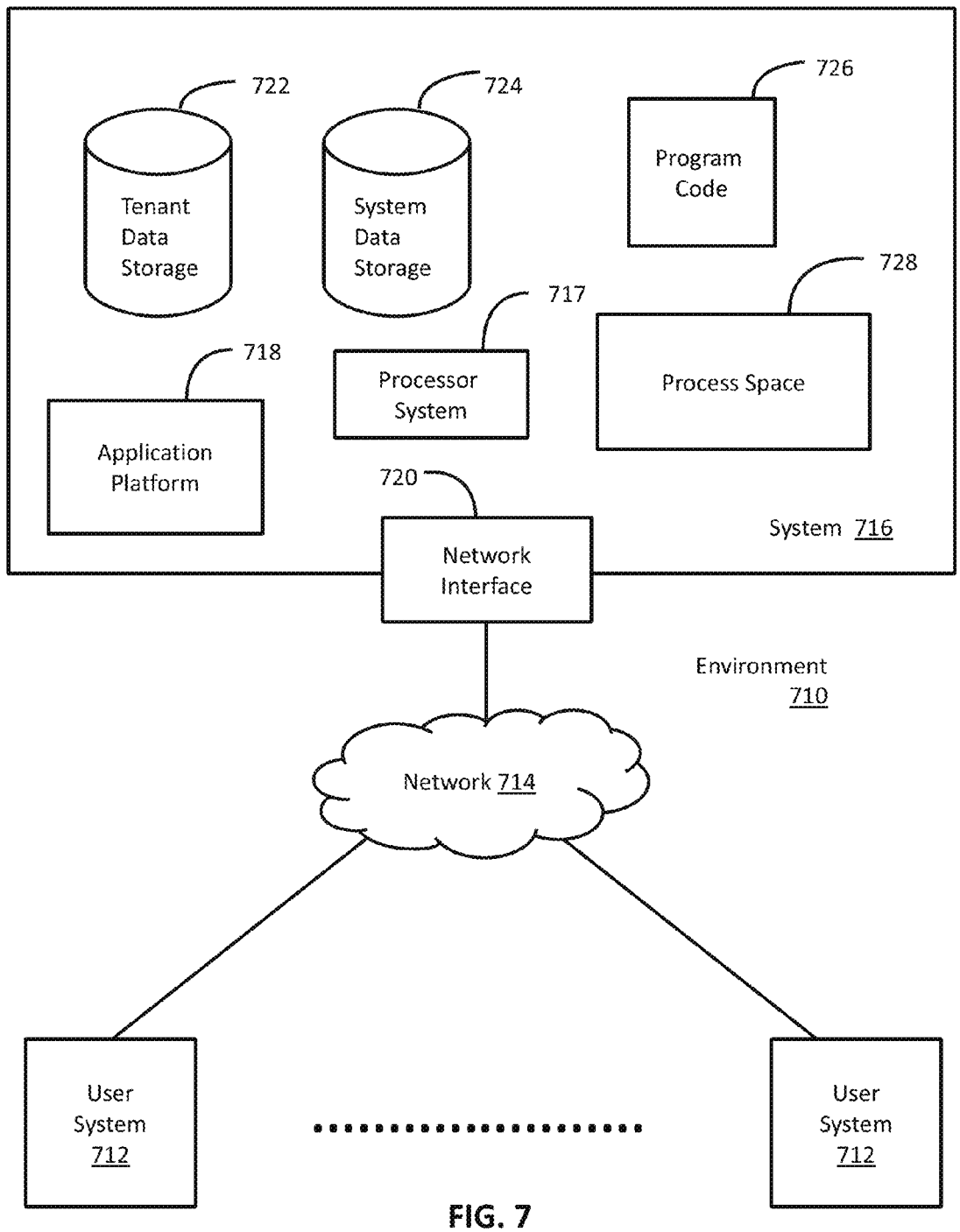
FIG. 7 illustrates a block diagram of an example of an environment wherein an on-demand database service might be used.

FIG. 7 illustrates a block diagram of an environment 710 wherein an on-demand database service might be used. Environment 710 may include user systems 712, network 714, system, 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Environment 710 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 7 (and in more detail in FIG. 8) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" will be used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application.

One arrangement for elements of system 716 is shown in FIG. 7, including a network interface 720, application platform 718, tenant data storage 722 for tenant data 723, system data storage 724 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7 include conventional, well-known elements that are explained only briefly here. For example, each user system 712 could include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 8:
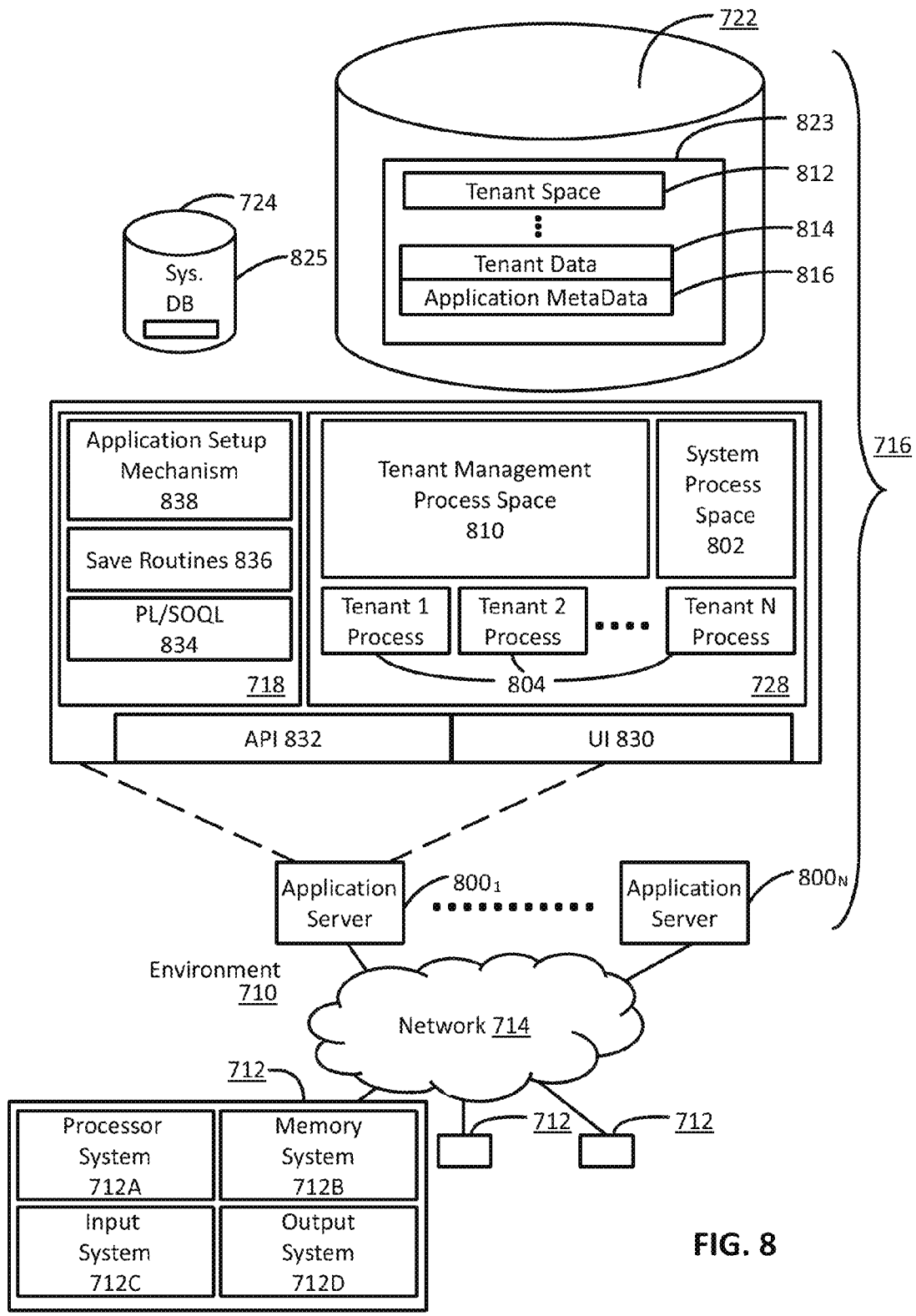
FIG. 8 illustrates a block diagram of an embodiment of elements of FIG. 7 and various possible interconnections between these elements.

FIG. 8 also illustrates environment 710. However, in FIG. 8 elements of system 716 and various interconnections in an embodiment are further illustrated. FIG. 8 shows that user system 712 may include processor system 712A, memory system 712B, input system 712C, and output system 712D. FIG. 8 shows network 714 and system 716. FIG. 8 also shows that system 716 may include tenant data storage 722, tenant data 723, system data storage 724, system data 725, User Interface (UI) 830, Application Program Interface (API) 832, PL/SOQL 834, save routines 836, application setup mechanism 838, applications servers $800_1$-$800_N$, system process space 802, tenant process spaces 804, tenant management process space 810, tenant storage area 812, user storage 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above in FIG. 7. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks. As shown by FIG. 8, system 716 may include a network interface 720 (of FIG. 7) implemented as a set of HTTP application servers 800, an application platform 718, tenant data storage 722, and system data storage 724. Also shown is system process space 802, including individual tenant process spaces 804 and a tenant management process space 810. Each application server 800 may be configured to tenant data storage 722 and the tenant data 723 therein, and system data storage 724 and the system data 725 therein to serve requests of user systems 712. The tenant data 723 might be divided into individual tenant storage areas 812, which can be either a physical arrangement and/or a logical arrangement of data. Within each tenant storage area 812, user storage 814 and application metadata 816 might be similarly allocated for each user. For example, a copy of a user's most recently used (MRU) items might be stored to user storage 814. Similarly, a copy of MRU items for an entire organization that is a tenant might be stored to tenant storage area 812. A UI 830 provides a user interface and an API 832 provides an application programmer interface to system 716 resident processes to users and/or developers at user systems 712. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PL/SOQL 834 that provides a programming language style interface extension to API 832. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 816 for the subscriber making the invocation and executing the metadata as an application in a virtual machine.

Each application server 800 may be communicably coupled to database systems, e.g., having access to system data storage 724 and tenant data storage 722, via a different network connection. For example, one application server $800_1$ might be coupled via the network 714 (e.g., the Internet), another application server $800_{N-1}$ might be coupled via a direct network link, and another application server $800_N$ might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 712 to distribute requests to the application servers 800. In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, system 716 is multi-tenant, wherein system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 800 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Method for Using the Environment (FIGS. 7 and 8)

Figure 9:
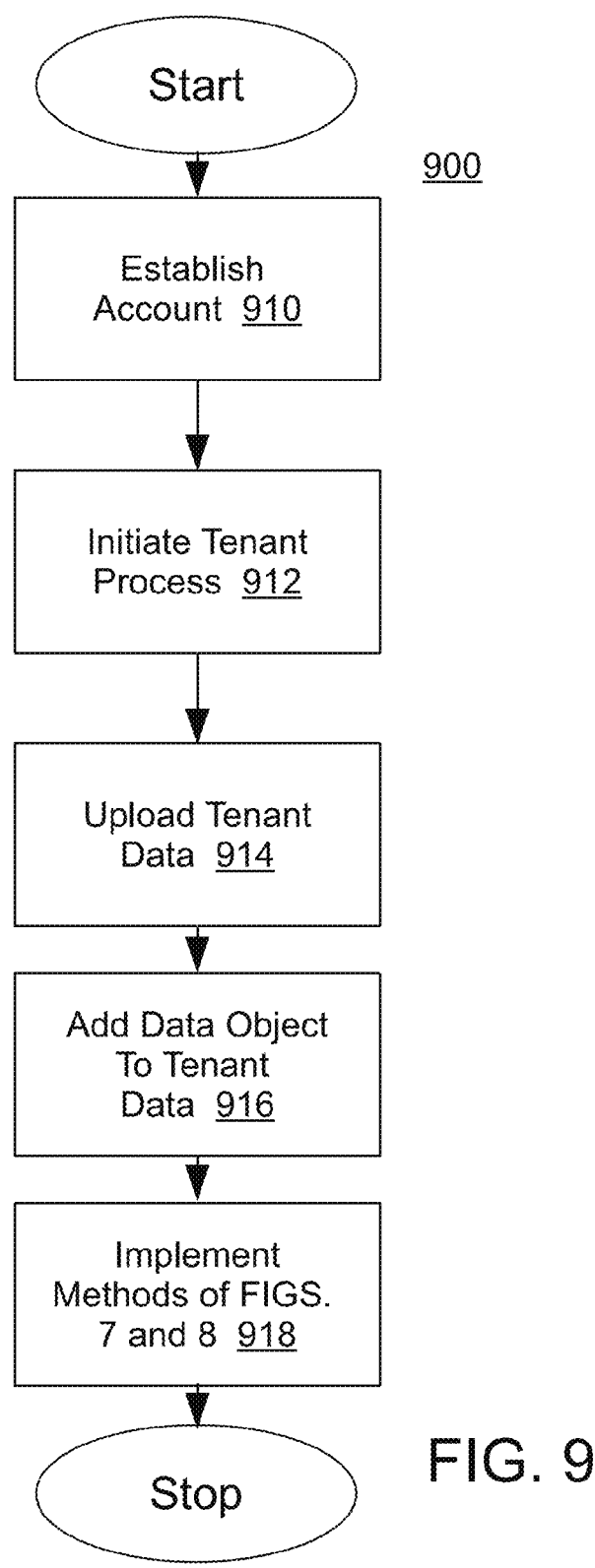
FIG. 9 illustrates a flow diagram illustrating a method for using the environment created in FIG. 7.

FIG. 9 shows a flowchart of an example of a method 900 of using environment 710. In step 910, user system 712 (FIGS. 7 and 8) establishes an account. In step 912, one or more tenant process space 804 (FIG. 7) are initiated on behalf of user system 712, which may also involve setting aside space in tenant space 812 (FIG. 8) and tenant data 814 (FIG. 8) for user system 712. Step 912 may also involve modifying application metadata to accommodate user system 712. In step 914, user system 712 uploads data. In step 916, one or more data objects are added to tenant data 814 where the data uploaded is stored. In step 918, the methods associated with FIG. 7 and FIG. 8 may be implemented. In another embodiment, although depicted as distinct steps in FIG. 9, steps 910-918 may not be distinct steps. In other embodiments, method 900 may not have all of the above steps and/or may have other steps in addition to, or instead of, those listed above. The steps of method 900 may be performed in another order. Subsets of the steps listed above as part of method 900 may be used to form their own method.

Method for Creating the Environment (FIGS. 7 and 8)

Figure 10:
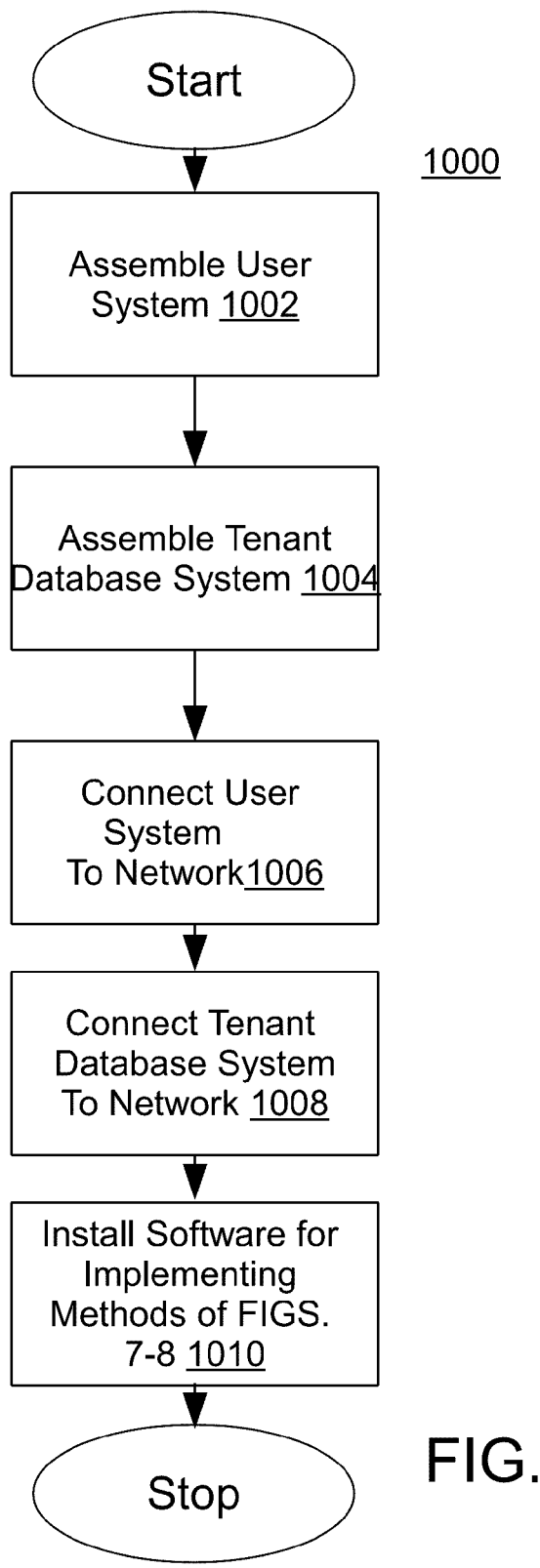
FIG. 10 illustrates a flow diagram illustrating a method for creating the environment in FIG. 7.

FIG. 10 is a method of making environment 710, in step 1002, user system 712 (FIGS. 7 and 8) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 1004, system 716 (FIGS. 7 and 8) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 716 may include installing application platform 718, network interface 720, tenant data storage 722, system data storage 724, program code 726, process space 728, UI 830, API 832, PL/SOQL 834, save routine 836, application setup mechanism 838, applications servers 800₁-800ₙ, system process space 802, tenant process spaces 804, tenant management process space 810, tenant space 812, tenant data 814, and application metadata 816 (FIG. 8).

In step 1006, user system 712 is communicatively coupled to network 714. In step 1008, system 716 is communicatively coupled to network 714 allowing user system 712 and system 716 to communicate with one another (FIG. 7). In step 1010, one or more instructions may be installed in system 716 (e.g., the instructions may be installed on one or more machine readable media, such as computer readable media, therein) and/or system 716 is otherwise configured for performing the steps of methods associated with FIG. 7 and FIG. 8. In an embodiment, each of the steps of method 1000 is a distinct step. In another embodiment, although depicted as distinct steps in FIG. 10, steps 1002-1010 may not be distinct steps. In other embodiments, method 1000 may not have all of the above steps and/or may have other steps in addition to, or instead of, those listed above. The steps of method 1000 may be performed in another order. Subsets of the steps listed above as part of method 1000 may be used to form their own method.

While, one or more implementations have been described by way of example and in terms of the specific embodiments, it is to be understood that one or more implementations are not preferred nor limited to the disclosed embodiments. To the contrary, it is intended to illustrate the technology disclosed and cover various modifications and similar arrangements as would be apparent to those skilled in the art without being overly complicated. Therefore, the scope of the appended claims should be accorded the broadest interpretation so as to encompass all such modifications and similar arrangements.

What is claimed:

1. A system comprising:
   a server system comprising one or more processors;
   a database system implemented using the server system, the database system configurable to cause:
   maintaining at least one database storing a plurality of articles of a knowledgebase and storing at least one object identifying a plurality of article categories, each article of the articles being associated with at least one corresponding article category according to content of the article, each article category being associated with at least one of a plurality of viewing permissions, the viewing permissions configurable to grant or deny user access to the articles;

processing a request from a user to access a first article, the first article associated with a first article category and with a second article category, the second article category being identified as a subcategory of the first article category, the first article category associated with a first set of viewing permissions providing more expansive access than a second set of viewing permissions associated with the second article category;

identifying, using the database system, a first permission of a first permission set associated with the user, the identified first permission having been assigned to the user based on a work role of the user within an organizational hierarchy, the work role being based on a plurality of data category visibility settings;

identifying, using the database system, a second permission of a second permission set associated with the user, the second permission set being different from the first permission set, the identified second permission having been assigned to the user based on a team of which the user is a member, the team being a group of users working on a shared project;

determining, using the database system, that the identified first permission comprises a viewing permission different from the identified second permission;

responsive to determining that the identified first permission comprises the different viewing permission, generating or updating, using the database system, a data category tree based at least on the identified first permission and the identified second permission, the data category tree being a first union of data representing a combination of viewing permissions for the user, the combination of viewing permissions providing access to the first article responsive to a single traversal by the database system of the data category tree;

creating a second union of data through a combination of two or more of the data category visibility settings;
    determining a plurality of most inclusive data categories;
    creating a third union of data through a combination of two or more of the most inclusive data categories;
    determining, using the data category tree, that the user has access to the first article based on the identified first permission or the identified second permission being indicated by the first article category or the second article category, the second article category comprising one of: a geographic location related to the first article or a product related to the first article; and
    responsive to the determining that the user has access to the first article, granting access to the user to view the first article and displaying information identifying the combination of the most inclusive data categories on a user device.

2. The system of claim 1, wherein an online profile of the user is based on a second work role of the user within an organizational hierarchy.

3. The system of claim 1, wherein the first article category is pre-set and determined by an administrator.

4. The system of claim 1, the database system further configurable to cause: determining, using the database system, that the first article category has more inclusive access than the second article category.

5. The system of claim 1, the database system further configurable to cause: generating or updating, using the database system, a fourth union of data based on the first article category.

6. The system of claim 5, the database system further configurable to cause:
    displaying the fourth union of data on the user device in response to processing a request for access to the first article.

7. The system of claim 1, the database system further configurable to cause: responsive to granting access to the user to view the first article, determining, using the database system, that the user has a level of access to make changes to the first article category; and creating or updating a third permission indicating that the user has administrator level access.

8. The system of claim 1, the database system further configurable to cause: tracking changes to the first article category on a page.

9. A computer-implemented method comprising:
    maintaining at least one database in a database system storing a plurality of articles of a knowledgebase and storing at least one object identifying a plurality of article categories, each article of the articles being associated with at least one corresponding article category according to content of the article, each article category being associated with at least one of a plurality of viewing permissions, the viewing permissions configurable to grant or deny user access to the articles, the database system comprising a computing system;
    processing a request from a user to access a first article, the first article associated with a first article category and with a second article category, the second article category being identified as a subcategory of the first article category, the first article category associated with a first set of viewing permissions providing more expansive access than a second set of viewing permissions associated with the second article category;
    identifying, using the database system, a first permission of a first permission set associated with the user, the identified first permission having been assigned to the user based on a work role of the user within an organizational hierarchy, the work role being based on a plurality of data category visibility settings;
    identifying, using the database system, a second permission of a second permission set associated with the user, the second permission set being different from the first permission set, the identified second permission having been assigned to the user based on a team of which the user is a member, the team being a group of users working on an shared project;
    determining, using the database system, that the identified first permission comprises a viewing permission different from the identified second permission;
    responsive to determining that the identified first permission comprises the different viewing permission, generating or updating, using the database system, a data category tree based at least on the identified first permission and the identified second permission, the data category tree being a first union of data representing a combination of viewing permissions for the user, the combination of viewing permissions providing access to the first article responsive to a single traversal by the database system of the data category tree,
    creating a second union of data through a combination of two or more of the data category visibility settings;
    determining a plurality of most inclusive data categories;

creating a third union of data through a combination of two or more of the most inclusive data categories;

determining, using the data category tree, that the user has access to the first article based on the identified first permission or the identified second permission being indicated by the first article category or the second article category, the second article category comprising one of: a geographic location related to the first article or a product related to the first article; and responsive to the determining that the user has access to the first article, granting access to the user to view the first article and causing display of information identifying the combination of the most inclusive data categories on a user device.

10. The method of claim 9, wherein an online profile of the user is based on a second work role of the user within an organizational hierarchy.

11. The method of claim 9, further comprising:
determining, using the database system, that the first article category has more inclusive access than the second article category.

12. The method of claim 9, further comprising:
generating or updating, using the database system, a fourth union of data based on the first article category.

13. The method of claim 12, further comprising:
displaying the fourth union of data on the user device in response to processing a request for access to the first article.

14. The method of claim 9, further comprising:
responsive to granting access to the user to view the first article, determining, using the database system, that the user has a level of access to make changes to the first article category; and
creating or updating a third permission indicating that the user has administrator level access.

15. A computer program product comprising a non-transitory computer-readable medium storing computer-readable program code to be executed by one or more processors, the program code comprising instructions configurable to cause:
maintaining at least one database in a database system storing a plurality of articles of a knowledgebase and storing at least one object identifying a plurality of article categories, each article of the articles being associated with at least one corresponding article category according to the content of the article, each article category being associated with at least one of a plurality of viewing permissions, the viewing permissions configurable to grant or deny user access to the articles;
processing a request from a user to access a first article, the first article associated with a first article category and with a second article category, the second article category being identified as a subcategory of the first article category, the first article category associated with a first set of viewing permissions providing more expansive access than a second set of viewing permissions associated with the second article category;
identifying, using the database system, a first permission of a first permission set associated with the user, the identified first permission having been assigned to the user based on a work role of the user within an organizational hierarchy, the work role being based on a plurality of data category visibility settings;
identifying, using the database system, a second permission of a second permission set associated with the user, the second permission set being different from the first permission set, the identified second permission having been assigned to the user based on a team of which the user is a member, the team being a group of users working on a shared project;
determining, using the database system, that the identified first permission comprises a viewing permission different from the identified second permission;
responsive to determining that the identified first permission comprises the different viewing permission, generating or updating, using the database system, a data category tree based at least on the identified first permission and the identified second permission, the data category tree being a first union of data representing a combination of viewing permissions for the user, the combination of viewing permissions providing access to the first article responsive to a single traversal by the database system of the data category tree;
creating a second union of data through a combination of two or more of the data category visibility settings;
determining a plurality of most inclusive data categories;
creating a third union of data through a combination of two or more of the most inclusive data categories;
determining, using the data category tree, that the user has access to the first article based on the identified first permission or the identified second permission being indicated by the first article category or the second article category, the second article category comprising one of: a geographic location related to the first article or a product related to the first article; and
responsive to the determining that the user has access to the first article, granting access to the user to view the first article and displaying information identifying the combination of the most inclusive data categories on a user device.

16. The computer program product of claim 15, wherein an online profile of the user is based on a second work role of the user within an organizational hierarchy.

17. The computer program product of claim 15, the instructions configurable to further cause: determining, using the database system, that the first article category has more inclusive access than the second article category.

18. The computer program product of claim 15, the instructions configurable to further cause: generating or updating, using the database system, a fourth union of data based on the first article category.

19. The computer program product of claim 15, the instructions configurable to further cause: responsive to granting access to the user to view the first article, determining, using the database system, that the user has a level of access to make changes to the first article category; and
creating or updating a third permission indicating that the user has administrator level access.

* * * * *